United States Patent [19]

Charbonneau et al.

[11] 4,429,100

[45] Jan. 31, 1984

[54] POLYESTER OF 6-HYDROXY-2-NAPHTHOIC ACID, PARA-HYDROXYBENZOIC ACID, 2,6-DIOXYANTHRAQUINONE, AND AROMATIC DIACID

[75] Inventors: Larry F. Charbonneau, Chatham; Gordon W. Calundann, North Plainfield, both of N.J.

[73] Assignee: Celanese Corporation, New York, N.Y.

[21] Appl. No.: 464,271

[22] Filed: Feb. 7, 1983

[51] Int. Cl.$^3$ ............................................. C08G 63/60
[52] U.S. Cl. .................................... 528/128; 528/125; 528/190; 528/191; 528/193; 528/194; 528/220; 528/271; 528/298
[58] Field of Search ............... 528/125, 128, 190, 193, 528/194, 220, 271, 191, 298

[56] References Cited

U.S. PATENT DOCUMENTS 4,188,476  2/1980  Irwin .................................. 528/194
4,224,433  9/1980  Calundann et al. ................. 528/190
4,355,134 10/1982  Charbonneau et al. ............ 528/190

Primary Examiner—Lester L. Lee
Attorney, Agent, or Firm—Burns, Doane, Swecker & Mathis

[57] ABSTRACT

A novel wholly aromatic polyester is provided which exhibits an optically anisotropic melt phase and an unusually low melting temperature which renders the same particularly suited for use as a matrix resin in the formation of a fiber reinforced composite article, etc. The polyester of the present invention consists essentially of recurring 6-oxy-2-naphthoyl moiety, p-oxybenzoyl moiety, 2,6-dioxyanthraquinone moiety, and dicarboxy aryl moiety (as described). The hydrogen atoms present upon the aromatic rings of these moieties optionally may be partially substituted (as described). The wholly aromatic polyester is capable of forming the desired anisotropic melt at a temperature below 260° C., and in a particularly preferred embodiment at a temperature below approximately 250° C.

18 Claims, No Drawings

POLYESTER OF 6-HYDROXY-2-NAPHTHOIC ACID, PARA-HYDROXYBENZOIC ACID, 2,6-DIOXYANTHRAQUINONE, AND AROMATIC DIACID

BACKGROUND OF THE INVENTION

Wholly aromatic polyester resins have long been known. For instance, 4-hydroxybenzoic acid homopolymer and copolymers have been provided in the past and are commercially available. Such polymers commonly are crystalline in nature, relatively high melting or possess a decomposition temperature which is below the melting point, and when molten frequently exhibit an isotropic melt phase. Molding techniques such as compression molding or sintering may be utilized with such materials. Representative publications which discuss these wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974) (c) *Aromatic Polyester Plastics*, by S. G. Cottis, Modern Plastics, Pages 62 and 63 (July 1975), and (d) *Poly(p-Oxybenzoyl Systems): Homopolymer for Coatings: Copolymers for Compression and Injection Molding*, by Roger S. Storm and Steve G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,662,052; 3,668,300; 3,723,388; 3,759,870; 3,767,621; 3,773,858; 3,787,370; 3,790,528; 3,829,406; 3,857,814; 3,884,876; 3,890,256; 3,974,250; and 3,975,487; and U.K. patent application No. 2,058,102A.

It has been disclosed that certain polyesters may be formed which exhibit melt anisotropy. See, for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics Composites Institute, The Society of the Plastics Industry, Inc., Section 17-D, Pages 1-4; (b) Belgian Pat. Nos. 838,935 and 838,936, (c) Dutch Pat. No. 7505551; (d) West German Nos. 2520819, 2520820, 2722120, 2834535, 2834536 and 2834537; (e) Japanese Nos. 2132-116; 3017-692; 3021-293; and 53-36594; (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,272,625; 4,272,803; 4,285,852; 4,287,332; 4,294,955; 4,299,756; 4,314,073; 4,314,688; 4,318,841; 4,318,842; 4,332,759; 4,333,907; 4,335,232; 4,355,132; 4,337,191; 4,339,375; 4,347,349; 4,351,917; 4,351,918; 4,355,133; 4,359,569; and 4,360,658; and U.S. Ser. No. 395,372 filed July 6, 1982 (now U.S. Pat. No. 4,375,372); (g) U.K. Application No. 2,002,404; and (h) European Patent Application Nos. 24,499 and 45,499.

Representative disclosures of anisotropic melt forming polyesters, poly(ester-amides), or poly(ester-carbonates) which may include 6-oxy-2-naphthoyl moiety are present in U.S. Pat. Nos. 4,161,470; 4,219,461; 4,256,624; 4,279,803; 4,299,756; 4,318,841; 4,318,842; 4,330,457; 4,337,190; 4,347,349; 4,351,917; 4,351,918; 4,355,133; and 4,359,569; and commonly assigned U.S. Ser. Nos. 319,024, filed Nov. 6, 1981 (now U.S. Pat. No. 4,371,660); 401,932, filed July 26, 1982; and 402,882, filed July 29, 1982.

Representative disclosures of anisotropic melt forming polyesters or poly(ester-amides) which may include 2,6-dioxyanthraquinone moiety are present in U.S. Pat. Nos. 4,188,476; 4,224,433; 4,341,688; 4,355,134; and U.S. Ser. No. 319,521, filed Nov. 9, 1981 (now U.S. Pat. No. 4,395,307).

In U.S. Pat. No. 4,219,461 a polyester is disclosed which comprises substantial concentrations of 6-oxy-2-naphthoyl and 4-oxybenzoyl moieties, and symmetrical dioxyaryl and symmetrical dicarboxyaryl moieties.

In commonly assigned U.S. Ser. No. 401,932, filed July 26, 1982, a polyester is disclosed which comprises a lesser concentration 6-oxy-2-naphthoyl moiety, 4-oxybenzoyl moiety, a symmetrical dioxyaryl moiety, and a dicarboxyaryl moiety.

In U.S. Pat. No. 4,299,756 a polyester is disclosed which comprises 6-oxy-2-naphthoyl moiety, 3-phenyl-4-oxybenzoyl or 2-phenyl-4-oxybenzoyl moiety, 1,3-dioxyphenylene moiety, and terephthaloyl moiety.

In U.S. Pat. No. 4,318,841 a polyester is disclosed which comprises 6-oxy-2-naphthoyl moiety, 4-oxybenzoyl moiety, the non-symmetrical 1,3-dioxyphenylene moiety, and terephthaloyl moiety.

In commonly assigned U.S. Ser. No. 319,521, filed Nov. 9, 1982 (now U.S. Pat. No. 4,395,307), entitled "Thermotropic Liquid Crystal Polymer Pulp and Method of Preparation Thereof Wherein Said Polymer Comprises Recurring Units Which Contain a 2,6-Dioxyanthraquinone Moiety" is disclosed in Example 1 the formation of a pulp beginning with the polyester of the present invention. The present invention was made prior to the pulp formation invention of U.S. Ser. No. 319,521.

It is an object of the present invention to provide an improved wholly aromatic polyester which exhibits an optically anisotropic melt phase and an unusually low melting temperature.

It is an object of the present invention to provide an improved wholly aromatic polyester which is particularly suited for use as a matrix resin in the formation of a fiber reinforced composite article.

It is a further object of the present invention to provide an improved wholly aromatic polyester which alternatively may be melt extruded at an unusually low extrusion temperature to form fibers and films.

These and other objects, as well as the scope, nature and utilization of the invention will be apparent to those skilled in the art from the following detailed description.

SUMMARY OF THE INVENTION

It has been found that a melt processable wholly aromatic polyester capable of forming an anisotropic melt phase at a temperature below approximately 260° C. consists essentially of the recurring moieties I, II, III, and IV which may include substitution of at least some of the hydrogen atoms present upon an aromatic ring wherein:

I is

II is

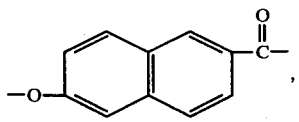

III is

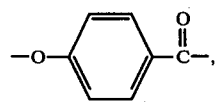

and
IV is

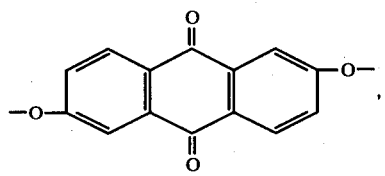

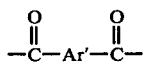

wherein Ar' is a divalent radical comprising at least one aromatic ring,
with the optional substitution if present being selected from the group consisting of an alkyl group of 1 to 4 carbon atoms, an alkoxy group of 1 to 4 carbon atoms, halogen, phenyl, and mixtures of the foregoing, and wherein the polyester comprises approximately 20 to 45 mole percent of moiety I, approximately 20 to 45 mole percent of moiety II, approximately 7.5 to 25 mole percent of moiety III, and approximately 7.5 to 25 mole percent of moiety IV.

DESCRIPTION OF PREFERRED EMBODIMENTS

The melt processable polyester of the present invention consists essentially of at least four recurring moieties which when combined in the polyester have been found to form an atypical highly tractable anisotropic melt phase at an unusually low temperature which is below approximately 260° C., and preferably below approximately 250° C. (e.g., below approximately 245° C.). the polymer melting temperature may be confirmed by the use of an optical microscope equipped with a hot stage that is capable of raising the temperature of the polymer melt to 300° C. The polyester of the present invention commonly exhibits a fluid melt at a temperature in the range of 200° to 255° C. Because of its ability to exhibit anisotropic properties (i.e. liquid crystalline properties) in the melt, the polyester readily can form a product having a highly oriented molecular structure upon melt processing. Preferred polyesters are capable of undergoing melt processing at a temperature in the range of approximately 210° to 250° C. The polyester of the present invention is considered to be wholly aromatic in the sense that each moiety present contributes at least one aromatic ring to the polymer chain.

The wholly aromatic polyester comprises four essential moieties. Moiety I can be termed a 6-oxy-2-naphthoyl moiety and possesses the structural formula:

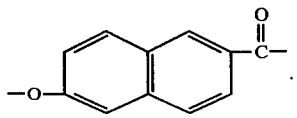

While not specifically illustrated in the structural formula, at least some of the hydrogen atoms present upon the aromatic rings of moiety I may be substituted. Such optional substitution may be an alkyl group of 1 to 4 carbon atoms, an alkoxy group of 1 to 4 atoms, halogen (e.g. Cl, Br, I), phenyl, and mixtures of the foregoing. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-4,7-dichloro-2-naphthoic acid, etc. The presence of ring substitution tends to modify to some degree the physical properties of the resulting polymer (e.g. the polymer may melt at an even lower temperature, its impact strength may be improved, and the crystallinity of the solid polymer may be decreased). In a preferred embodiment wherein a polyester of optimum crystallinity in the solid state is desired, no ring substitution is present. For instance, moiety I is then derived from unsubstituted 6-hydroxy-2-naphthoic acid or its derivatives.

A convenient laboratory preparation for forming 6-hydroxy-2-naphthoic acid is described in Berichte, Vol. 58, 2835-45 (1925) by K. Fries and K. Schimmelschmidt which is herein incorporated by reference. U.S. Pat. No. 1,593,816 is concerned with a process for synthetizing 6-hydroxy-2-naphthoic acid by reacting carbon dioxide with the potassium salt of beta-naphthol. See also the process of U.S. Pat. No. 4,287,357.

Moiety I comprises approximately 20 to 45 mole percent of the wholly aromatic polyester. In a preferred embodiment moiety I is present in a concentration of approximately 25 to 40 mole percent, and most preferably in a concentration of approximately 30 mole percent.

The second essential moiety (i.e. moiety II) can be termed a p-oxybenzoyl moiety and possesses the structural formula:

While not specifically illustrated in the structural formula, at least some of the hydrogen atoms present upon the aromatic ring of moiety II may be substituted. Such optional substitution may be an alkyl group of 1 to 4 carbon atoms, an alkoxy group of 1 to 4 carbon atoms, halogen (e.g. Cl, Br, I), phenyl, and mixtures of the foregoing. Representative examples of ring substituted compounds from which moiety II can be derived include 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 3-methyl-4-hydroxybenzoic acid, 3,5-dimethyl-4- hydroxybenzoic acid, 2,6-dimethyl-4-hydroxybenzoic acid, 3-methoxy-4-hydroxybenzoic acid, 3,5-dimethoxy-4-hydroxybenzoic acid, etc. The presence of ring substitution in moiety II tends to modify to some degree the physical properties of the resulting polymer as previously described in connection with moiety I. In a preferred embodiment wherein a polyester of optimum crystallinity in the solid state is desired, no ring substitution is present. For instance, moiety II is then derived from unsubstituted p-hydroxybenzoic acid or its derivatives.

Moiety II comprises approximately 20 to 45 mole percent of the wholly aromatic polyester. In a preferred embodiment moiety II is present in a concentration of approximately 25 to 40 mole percent, and most preferably in a concentration of approximately 40 mole percent.

The third essential moiety (i.e. moiety III) can be termed a 2,6-dioxyanthraquinone moiety and possesses the structural formula:

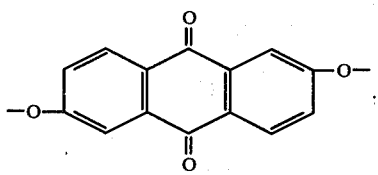

While not specifically illustrated in the structural formula, at least some of the hydrogen atoms present upon the aromatic rings of moiety III may be substituted. Such optional substitution may be an alkyl group of 1 to 4 carbon atoms, an alkoxy group of 1 to 4 carbon atoms, halogen (e.g. Cl, Br, I), phenyl, and mixtures of the foregoing. The presence of ring substitution tends to modify to some degree the physical properties of the resulting polymer (e.g. the polymer may soften at a lower temperature, its impact may be improved, and the crystallinity of the solid polymer may be decreased). In a preferred embodiment wherein a polyester of optimum crystallinity in the solid state is desired, no ring substitution is present. For instance, moiety III is then derived from unsubstituted 2,6-dihydroxyanthraquinone and its derivatives.

Unsubstituted 2,6-dihydroxyanthraquinone is available commercially under the common name of anthraflavic acid from Imperial Chemical Industries and others. The inclusion of the 2,6-dioxyanthraquinone moiety in combination with the other recited moieties has been found necessary to yield a polyester which exhibits an optically anisotropic melt phase and which melts at the unusually low temperature indicated.

Moiety III is present in the polyester of the present invention in a concentration of approximately 7.5 to 25 mole percent. In a preferred embodiment moiety III is present in a concentration of approximately 10 to 22.5 mole percent, and most preferably in a concentration of approximately 10 mole percent.

The fourth essential moiety (i.e. moiety IV) can be termed a dicarboxy aryl moiety of the formula:

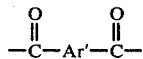

where Ar' is a divalent radical comprising at least one aromatic ring. Preferably, the divalent radical Ar' is selected from one or more of the following:

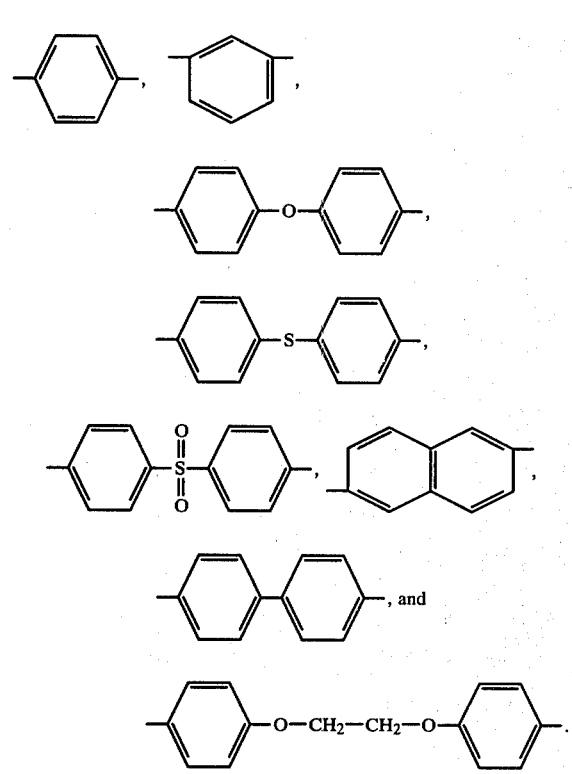

Other Ar' radicals than those specifically illustrated can be selected. In a preferred embodiment Ar' is a phenylene radical, e.g. p-phenylene, m-phenylene, or mixtures of the same. While not specifically illustrated in the structural formulas above, at least some of the hydrogen atoms present upon the aromatic rings of moiety IV may be substituted. Such optional substitution may be an alkyl group of 1 to 4 carbon atoms, an alkoxy group of 1 to 4 carbon atoms, halogen (e.g. Cl, Br, I), phenyl, and mixtures of the foregoing. The presence of ring substitution tends to modify to some degree the physical properties of the resulting polymer (e.g. the polymer may soften at a lower temperature, its impact strength may be improved, and the crystallinity of the solid polymer may be decreased). In a preferred embodiment wherein a polyester of optimum crystallinity in the solid state is desired, no ring substitution is present. For instance, moiety IV may be derived from unsubstituted terephthalic acid or unsubstituted isophthalic acid or mixtures of these.

Moiety IV is present in the polyester of the present invention in a concentration of approximately 7.5 to 25 mole percent. In a preferred embodiment moiety IV is present in a concentration of approximately 10 to 22.5 mole percent.

In a particularly preferred embodiment the melt processable wholly aromatic polyester of the present invention is capable of forming an anisotropic melt phase at a temperature below approximately 245° C. and consists essentially of the recurring moieties I, II, III, IVa and IVb which are substantially free of ring substitution wherein:

I is

II is

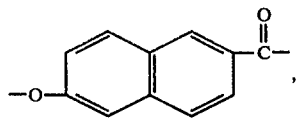

III is

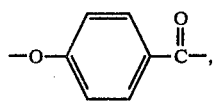

IVa is

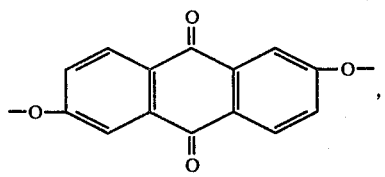

and
IVb is

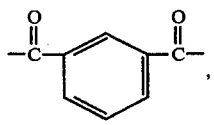

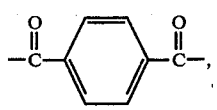

wherein the polyester comprises approximately 30 mole percent of moiety I, approximately 40 mole percent of moiety II, approximately 15 mole percent of moiety III, approximately 10 mole percent of moiety IVa, and approximately 5 mole percent of moiety IVb.

It should be understood that other aryl ester-forming moieties than moieties I and II which provide combined oxy and carboxy units may be included in the wholly aromatic polyester of the present invention in a minor concentration. For instance, a meta-oxybenzoyl moiety may be included. This component has the propensity to soften the polymer and to decrease its crystallinity in the solid state. Additionally, other aryl ester-forming moieties than moiety III which contribute dioxy units (e.g. 1,3-dioxyphenylene or 1,4-dioxyphenylene) may be included in the wholly aromatic polyester of the present invention in a minor concentration. These components have the propensity to alter the anisotropy of the polymer, e.g. 1,3-dioxyphenylene units lower the level of anisotropy and 1,4-dioxyphenylene units increase the level of anisotropy. Such minor concentrations generally do not exceed about 10 mole percent and may be tolerated so long as such additional moieties do not destroy the desired anisotropic melt phase exhibited by the polyester heretofore defined and do not raise the melting temperature of the resulting polymer above that specified. As will be apparent to those skilled in the art, the total molar quantities of dioxy units and dicarboxy units present within the wholly aromatic polyester will be substantially equal.

The wholly aromatic polyester of the present invention exhibits

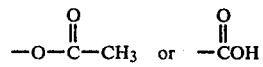

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

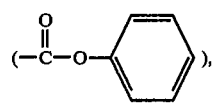

and methylester

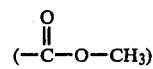

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluoroisopropanol and o-chlorophenol, and accordingly are not susceptible to solution processing. They can surprisingly be readily processed by common melt processing techniques as discussed hereafter. Most compositions are soluble in pentafluorophenol to a limited degree.

The wholly aromatic polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in a pentafluorophenol solution may be employed to determine the molecular weight.

The wholly aromatic polyester prior to heat treatment additionally commonly exhibits an inherent viscosity (i.e., I.V.) of at least approximately 1.0, and preferably at least approximately 1.5, (e.g., approximately 1.5 to 5 or more) when dissolved in a concentration of 0.1 percent by weight in pentafluorophenol at 60° C.

Unlike the aromatic polyesters commonly encountered in much of the prior art, the wholly aromatic polyester of the present invention is not intractable and forms an anisotropic melt phase whereby an atypical degree of order is manifest in the molten polymer. The subject polyester readily forms liquid crystals in the melt phase and accordingly exhibits a high tendency for the polymer chains to orient in the shear direction. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow), however, the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants wherein reactants such as terephthalic acid initially are present as solids with the reaction continuing as solid polymer particles are formed and suspended therein. A vacuum may be applied to facilitate removal of volatiles formed during the final stage of the condensation (e.g., acetic acid or water).

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the wholly aromatic polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which the 6-oxy-2-naphthoyl moiety (i.e., moiety I), the p-oxybenzoyl moiety (i.e., moiety II), and the 2,6-dioxyanthraquinone moiety (i.e., moiety III), are derived may be initially provided in a modified form whereby the usual hydroxyl groups of the monomers which yield these moieties are esterified (i.e., they are provided as acyl esters). For instance, lower acyl esters of 6-hydroxy-2-naphthoic acid, p-hydroxy benzoic acid, and 2,6-dihydroxyanthraquinone may be provided as reactants. The lower acyl groups preferably have from about 2 to about 4 carbon atoms. Preferably the acetate esters of the organic compounds which form moieties I, II, and III are provided. Accordingly, particularly preferred reactants for the condensation reaction are 6-acetoxy-2-naphthoic acid, p-acetoxybenzoic acid, and 2,6-dihydroxyanthraquinone diacetate. If minor quantities of other aryl reactants (as previously discussed) optionally provide oxy units within the resulting polymer, these too preferably are provided as the corresponding lower acyl esters.

Representative catalysts which optionally may be employed in either the melt acidolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere below its melting temperature.

The wholly aromatic polyester of the present invention readily can be melt processed to form a variety of shaped articles, e.g., molded three-dimensional articles, fibers, films, tapes, etc., at an unusually low processing temperature. The polyester of the present invention is suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques utilized. Fibers or films may be melt extruded. The polyester of the present invention is particularly suited for use as a matrix resin in the formation of a fiber reinforced (e.g., glass or carbon fibers) composite article.

A molding compound may be formed from the wholly aromatic polyester of the present invention which incorporates approximately 1 to 60 percent by weight of a solid filler (e.g. talc) and/or reinforcing agent (e.g. glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e. a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable wholly aromatic polyester is supplied to the extrusion orifice at a temperature above its melting temperature, e.g., a temperature of about 200° to 260° C.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films may be thermally treated in an inert atmosphere (e.g., nitrogen, argon, helium or steam) or in a flowing oxygen-containing atmosphere (e.g. air) with or without stress at a temperature below the polymer melting temperature until the desired property enhancement is achieved. Thermal treatment times commonly range from a few minutes to several days. Optimum heat treatment conditions will vary with the specific composition of the wholly aromatic polyester and with the fiber's process history.

The resulting fibers may be used with particular advantage as tire cords and in other industrial applications, such as conveyor belts, hose, cabling, resin reinforcement, etc. Films formed of the wholly aromatic polyester of the present invention may be used as strapping tape, cable wrap, magnetic tape, electric motor dielectric film, etc. The fibers and films exhibit an inherent resistance to burning.

The following examples are presented as specific illustrations of the claimed invention. It should be understood, however, that the invention is not limited to the specific details set forth in the examples.

EXAMPLE I

To a three-neck round bottom flask equipped with a paddle stirrer, nitrogen inlet tube and distillation head connected to a condenser and distillate receiver were added the following:

(a) 29.4 grams of 6-acetoxy-2-naphthoic acid (0.128 mole),
(b) 30.6 grams of 4-acetoxybenzoic acid (0.17 mole),
(c) 20.67 grams of 2,6-dihydroxyanthraquinone diacetate (0.064 mole),
(d) 7.061 grams of isophthalic acid (0.043 mole), and
(e) 3.530 grams of terephthalic acid (0.021 mole).

After evacuating to less than 1 Torr and purging with nitrogen three times, the flask was warmed to 250° C. (via an external sand bath) to initiate polymerization. Over a period of five hours the temperature of the reaction vessel was raised from 250° C. to 310° C. during which time the monomers polymerized to a viscous light brown melt. Next the distillate receiver was removed and the reaction vessel was evacuated to 0.3 Torr for one-half hour while the temperature was maintained at 310° C. Following cooling to room temperature the polymer was extracted in a Soxlet extractor with acetone and low boiling petroleum ether.

The inherent viscosity (I.V.) of the polymer was 1.79 as determined in a pentafluorophenol solution of 0.1 percent by weight concentration at 60° C.

$$I.V. = \frac{\ln(\eta rel)}{c},$$

where c=concentration of solution (0.1 percent by weight), and $\eta$rel=relative viscosity. When the polymer was subjected to differential scanning calorimetry (20° C./min. heating rate), it exhibited a glass transition temperature at 113° C. The polymer melt was optically anisotropic.

The polymer was melt extruded into a continuous filament of 8.94 denier. More specifically, the polymer melt while at a temperature of 240° C. was extruded at a throughput rate of 0.14 grams/min. through a spinneret provided with a single hole jet having a diameter of 7 mils. The extruded filament was quenched in ambient air (i.e., at 72° F. and 65 percent relative humidity). The as-spun filament was taken-up at a rate of 136 meters per minute.

The resulting as-spun wholly aromatic polyester fiber exhibited the following average single filament properties:

Tenacity (grams per denier): 6.09
Tensile modulus (grams per denier): 443
Elongation (percent): 1.86

EXAMPLE II

Example I was substantially repeated with the exceptions indicated:

To the three-neck round bottom flask were added the following:

(a) 34.5 grams of 6-acetoxy-2-naphthoic acid (0.15 mole),
(b) 27.0 grams of 4-acetoxybenzoic acid (0.15 mole),
(c) 32.4 grams of 2,6-dihydroxyanthraquinone diacetate (0.1 mole), and
(d) 16.6 grams of terephthalic acid (0.1 mole).

The inherent viscosity of the polymer was 0.9 as determined in a pentafluorophenol solution of 0.1 percent by weight concentration at 60° C. When the polymer was subjected to differential scanning colorimetry (20° C./min. heating rate), it exhibited a glass transition temperature at 108° C. The polymer melt was optically anisotropic.

While at 251° C. the polymer was melt extruded through an appropriate orifice to form a continuous filament of 3.5 denier. More specifically, the polymer melt was extruded at a throughput rate of 0.42 grams/min. through a spinneret provided with a single hole having a diameter of 7 mils prior to being quenched in ambient air. The as-spun filament was taken-up at a rate of 1150 meters per minute.

The resulting as-spun wholly aromatic polyester fiber exhibited the following average single filament properties:

Tenacity (grams per denier): 2.6
Tensile modulus (grams per denier): 397
Elongation (percent): 0.67

EXAMPLE III

Example I was substantially repeated with the exceptions indicated. To the three-neck round bottom flask were added the following:

(a) 46.0 grams of 6-acetoxy-2-naphthoic acid (0.2 mole),
(b) 36.0 grams of 4-acetoxybenzoic acid (0.2 mole),
(c) 16.2 grams of 2,6-dihydroxyanthraquinone diacetate (0.05 mole), and
(d) 8.3 grams of terephthalic acid (0.05 mole).

After the flask was evacuated and purged with nitrogen three times, it was warmed to 250° C. (via an external sand bath) to initiate polymerization. Subsequently the flask was heated to 310° C. over a period of 5 hours to form a light brown viscous polymer melt. The distallate receiver was removed and the reaction vessel was evacuated to 0.7 Torr for one-half hour while the polymer melt was maintained at 310° C. The vessel was placed under a positive pressure of nitrogen and the stirring shaft was removed from the flask. Filaments were easily drawn from the hot polymer melt clinging to the stirrer. After cooling to room temperature, the reaction vessel was broken to obtain the remaining polymer which was ground in a Wiley mill and dried at 90° C. for 3 days before spinning.

The polymer had an inherent viscosity of 1.90 when dissolved in a concentration of 0.1 percent by weight in a 50/50 mixture of pentafluorophenol/hexafluoroisopropanol at room temperature. It is anticipated that the polymer would have also exhibited an inherent viscosity of approximately 1.90 if dissolved in a concentration of 0.1 percent by weight in pentafluorophenol at 60° C. When examined by differential scanning calorimetry at 20° C. per minute heating rate, the polymer exhibited a glass transition at 102° C. The polymer melt was anisotropic.

The polymer was spun through a single hole jet (described in Example I) at melt temperatures between 207° C. and 266° C. at a through-put rate of 0.14 grams/minute. The optimum spinning temperature was judged to be 250° C. and an additional filament was spun with a through-put rate of 0.42 grams/minute at 250° C. The spinning conditions employed and the denier of the resulting fiber are reported below:

| Run Identification | Melt Temperature (°C.) | Through-Put (g./min.) | Take-up Speed (m./min) | Denier Per Filament |
|---|---|---|---|---|
| a | 207 | 0.14 | 90 | 10.5 |
| b | 220 | 0.14 | 287 | 5.4 |
| c | 236 | 0.14 | 686 | 3.0 |
| d | 250 | 0.14 | 759 | 1.6 |
| e | 266 | 0.14 | 608 | 0.92 |
| f | 250 | 0.42 | 1238 | 1.9 |

The tenacity, tensile modulus and elongation for the as-spun fiber of each run were determined. The following average single filament properties were observed:

| Run Identification | Tenacity (grams/denier) | Tensile Modulus (grams/denier) | Elongation (percent) |
|---|---|---|---|
| a | 3.5 | 472 | 0.79 |
| b | 3.9 | 529 | 0.81 |
| c | 3.7 | 497 | 1.17 |
| d | 4.6 | 600 | 0.84 |
| e | 3.3 | 440 | 0.80 |
| f | 3.7 | 434 | 0.88 |

Although the invention has been described with preferred embodiments it is to be understood that variations and modifications may be employed without departing from the concept of the invention as defined in the following claims.

We claim:

1. A melt processable wholly aromatic polyester capable of forming an anisotropic melt phase at a temperature below approximately 260° C. consisting essentially of the recurring moieties I, II, III, and IV which may include substitution of at least some of the hydrogen atoms present upon an aromatic ring wherein:

I is

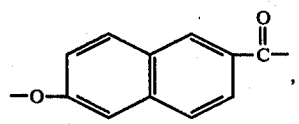

II is

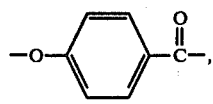

III is

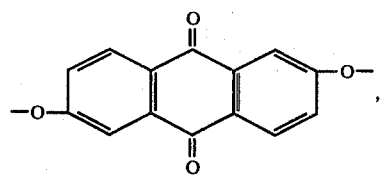

and
IV is

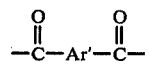

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, phenyl, and mixtures of the foregoing, and wherein said polyester comprises approximately 20 to 45 mole percent of moiety I, approximately 20 to 45 mole percent of moiety II, approximately 7.5 to 25 mole percent of moiety III, and approximately 7.5 to 25 mole percent of moiety IV.

2. A melt processable wholly aromatic polyester according to claim 1 which is capable of forming an anisotropic melt at a temperature below approximately 250° C.

3. A melt processable wholly aromatic polyester according to claim 1 which is capable of undergoing melt processing at a temperature in the range of approximately 200° to 260° C.

4. A melt processable wholly aromatic polyester according to claim 1 wherein Ar' of moiety IV is phenylene.

5. A melt processable wholly aromatic polyester according to claim 1 wherein Ar' of moiety IV is a combination of m-phenylene and p-phenylene moieties.

6. A melt processable wholly aromatic polyester according to claim 1 wherein each moiety is substantially free of ring substitution.

7. A melt processable wholly aromatic polyester according to claim 1 which exhibits an inherent viscosity of at least 1.0 when dissolved in a concentration of 0.1 percent by weight in pentafluorophenol at 60° C.

8. A melt processable wholly aromatic polyester according to claim 1 which exhibits an inherent viscosity of at least 1.5 when dissolved in a concentration of 0.1 percent by weight in pentafluorophenol at 60° C.

9. A melt processable wholly aromatic polyester according to claim 1 which exhibits an inherent viscosity of approximately 1.5 to 5.0 when dissolved in a concentration of 0.1 percent by weight in pentafluorophenol at 60° C.

10. A melt processable wholly aromatic polyester capable of forming an anisotropic melt phase at a temperature below approximately 250° C. consisting essentially of the recurring moieties I, II, III, and IV which may include substitution of at least some of the hydrogen atoms present upon an aromatic ring wherein:

I is

II is

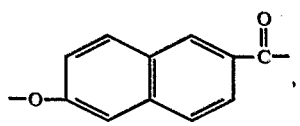

III is

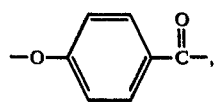

and
IV is

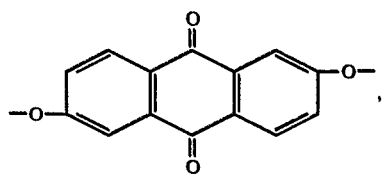

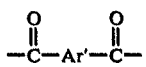

where Ar' is a divalent radical comprising at least one aromatic ring,
with said optional substitution if present being selected from the group consisting of an alkyl group of 1 to 4 carbon atoms, an alkoxy group of 1 to 4 carbon atoms, halogen, phenyl, and mixtures of the foregoing, and wherein said polyester comprises approximately 20 to 40 mole percent of moiety I, approximately 25 to 40 mole percent of moiety II, approximately 10 to 22.5 mole percent of moiety III, and approximately 10 to 22.5 mole percent of moiety IV.

11. A melt processable wholly aromatic polyester according to claim 10 which is capable of undergoing melt processing at a temperature in the range of approximately 200° to 260° C.

12. A melt processable wholly aromatic polyester according to claim 10 wherein Ar' of moiety IV is phenylene.

13. A melt processable wholly aromatic polyester according to claim 10 wherein Ar' of moiety IV is a combination of m-phenylene and p-phenylene moieties.

14. A melt processable wholly aromatic polyester according to claim 10 wherein each moiety is substantially free of ring substitution.

15. A melt processable wholly aromatic polyester according to claim 10 which exhibits an inherent viscosity of at least 0.1 when dissolved in a concentration of 0.1 percent by weight in pentafluorophenol at 60° C.

16. A melt processable wholly aromatic polyester according to claim 10 which exhibits an inherent viscosity of at least 1.5 when dissolved in a concentration of 0.1 percent by weight in pentafluorophenol at 60° C.

17. A melt processable wholly aromatic polyester according to claim 10 which exhibits an inherent viscosity of approximately 1.5 to 5.0 when dissolved in a concentration of 0.1 percent by weight in pentafluorophenol at 60° C.

18. A melt processable wholly aromatic polyester capable of forming an anisotropic melt phase at a temperature below approximately 245° C. consisting essentially of the recurring moieties I, II, III, IVa and IVb which are substantially free of ring substitution wherein:

I is

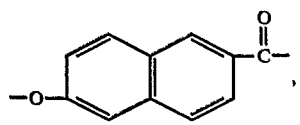

II is

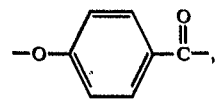

III is

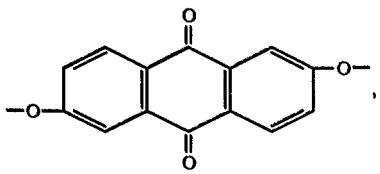

IVa is

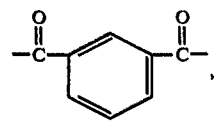

and
IVb is

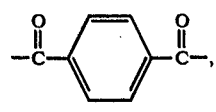

wherein said polyester comprises approximately 30 mole percent of moiety I, approximately 40 mole percent of moiety II, approximately 15 mole percent of moiety III, approximately 10 mole percent of moiety IVa, and approximately 5 mole percent of moiety IVb.

* * * * *